United States Patent [19]

Lesko

[11] Patent Number: 5,536,465
[45] Date of Patent: Jul. 16, 1996

[54] LONG-GELLING INTERNAL MOLD RELEASE COMPOSITIONS FOR STRUCTURAL RIM PROCESSES

[75] Inventor: Merle W. Lesko, McDonald, Pa.

[73] Assignee: Bayer Corporation, Pittsburgh, Pa.

[21] Appl. No.: 350,863

[22] Filed: Dec. 7, 1994

Related U.S. Application Data

[63] Continuation of Ser. No. 193,962, Feb. 9, 1994, abandoned.

[51] Int. Cl.$^6$ .......................... B29C 45/14; C08G 18/28
[52] U.S. Cl. .............. 264/257; 264/328.6; 264/331.160; 264/331.190; 264/300; 521/124; 521/163; 521/167; 528/68; 528/74.5; 528/75
[58] Field of Search ................................ 264/257, 328.6, 264/331.16, 331.19, 130, 338, 300; 521/163, 167, 124; 524/711, 780, 874; 528/74.5, 75, 68

[56] References Cited

U.S. PATENT DOCUMENTS

| | | | |
|---|---|---|---|
| Re. 33,609 | 6/1991 | Novelman | 264/53 |
| 4,289,682 | 9/1981 | Peters | 264/331.19 |
| 4,435,349 | 3/1984 | Dominguez et al. | 264/257 |
| 4,499,254 | 2/1985 | Dominguez et al. | 264/331.19 |
| 4,810,444 | 3/1989 | Alberino et al. | 264/331.19 |
| 4,868,224 | 9/1989 | Harasin et al. | 521/124 |
| 4,876,019 | 10/1989 | Meyer et al. | 252/32.5 |
| 4,954,537 | 9/1990 | Sanns Jr. | 264/328.6 |
| 4,965,293 | 10/1990 | Sanns, Jr. | 264/328.6 |
| 5,019,317 | 5/1991 | Slocum et al. | 264/300 |
| 5,125,973 | 6/1992 | Mafoti | 264/328.6 |
| 5,128,087 | 7/1992 | Slocum et al. | 264/328.6 |
| 5,154,871 | 10/1992 | Wagner et al. | 264/331.19 |
| 5,160,538 | 11/1992 | Mafoti | 264/328.6 |
| 5,164,143 | 11/1992 | Meyer et al. | 264/328.6 |
| 5,182,034 | 1/1993 | Meyer et al. | 264/328.6 |
| 5,204,170 | 4/1993 | Kuyzin et al. | 264/331.19 |
| 5,277,862 | 1/1994 | Steppan et al. | 264/331.19 |
| 5,399,310 | 3/1995 | Payne et al. | 264/328.6 |

Primary Examiner—Jay H. Woo
Assistant Examiner—Duane S. Smith
Attorney, Agent, or Firm—Joseph C. Gil; N. Denise Brown

[57] ABSTRACT

The present invention relates to a process for the preparation of a SRIM molded product wherein the mold cavity has minimum dimensions of 1000 mm×100 mm×3.5 mm. The reaction mixture contains an isocyanate component and an isocyanate reactive component at an isocyanate index of from about 90 to about 400. The reinforcing fiber mat is present in an amount of from 50 to 65% by weight, based on the combined weight of the reaction mixture and the reinforcing fiber mat. In particular, the isocyanate component is 1) a polymethylene poly(phenyl isocyanate) having an isocyanate group content of from 25 to 40% by weight, and a diisocyanate content of 45–55% by weight; and 2) the isocyanate-reactive component comprises a) from about 1 to 15% by weight, based on the total weight of the isocyanate reactive component, of a fatty acid, b) from about 0.5 to 10% by weight, based on the total weight of the isocyanate-reactive component, of a zinc-carboxylate, and c) a polyol component.

4 Claims, No Drawings

LONG-GELLING INTERNAL MOLD RELEASE COMPOSITIONS FOR STRUCTURAL RIM PROCESSES

This application is a continuation of application Ser. No. 08/193,962 filed Feb. 9, 1994, now abandoned.

BACKGROUND OF THE INVENTION

The present invention relates to new internal mold release compositions which increase the gel time of reaction mixtures, thereby enabling large molds to be filled easier via the Structural Reaction Injection Molding (i.e. SRIM) process.

SRIM processes for the production of molded parts having enhanced flexural modules are increasing in importance in the automotive industry, etc. There are, however, numerous problems associated with the use of a reinforcing mat in the SRIM process. These problems include displacement of the mat in the mold, incomplete filling of the mold, and part distortion. It is believed that some of the problems are due to the RIM reactants reaching too high a viscosity in too short a time to allow the mat to be completely impregnated with the reaction mixture.

One solution to this problem was described in U.S. Pat. No. 4,435,349. This patent describes the use of a reaction mixture of a polyisocyanate, with a polyol having an equivalent weight of above 500, a relatively low molecular weight chain extender, and a delayed action catalyst. The working examples of the patent use an excess of polyol having an equivalent weight of over 1800 and a molecular weight of no less than about 5500.

U.S. Pat. No. Re. 33,609 described another solution to some of the problems associated with SRIM processes. The reaction mixture used in this patent comprises an organic polyisocyanate with a specific polyol blend. The specific polyol blend comprises at least one polyether polyol having a hydroxy functionality of from 2 to 8 and a molecular weight of from 350 to below 1100, at least one hydroxyl functional material containing from 2 to 8 hydroxyl groups and having a molecular weight of below 350, and no more than 45% by weight, based on the total weight of the polyol component, of an active hydrogen containing compound having a molecular weight of 1800 or more. However, this systems described by this patent are relatively fast in terms of gel times and reactivities. Accordingly, these systems are not suitable for filling large molds.

U.S. Pat. No. 4,868,224 relates to a system that provides easy release from a bare metal mold. This system utilizes a zinc carboxylate in the B-side of the reaction mixture. However, one problem with this system is that the zinc carboxylate/solubilizer combination catalyzes the hydroxyl/isocyanate reaction. This makes the system relatively fast in terms of gel times, thereby leading to problems in filling large molds.

Another IMR composition for use in flexible foam systems is described in U.S. Pat. No. 4,876,019. These IMR compositions comprise: (A) at least one metal salt of an organic compound derived from a compound containing at least one carboxylic acid group, phosphorus containing acid groups, or boron containing acid groups or mixtures thereof, wherein the organic material contains a backbone of siloxane chains or at least one terminal or pendant saturated or unsaturated aliphatic hydrocarbon chain containing at least about 7 carbon atoms; (B) a compound containing at least one primary amine group and/or at least one secondary amine group per molecule or mixtures thereof; and, optionally, (C) at least one organic compound containing at least one carboxylic acid group, phosphorus containing acid groups, or boron containing acid groups or mixtures thereof, wherein the organic compound contains a backbone of siloxane chains or at least one terminal or pendant saturated or unsaturated aliphatic hydrocarbon chain containing at least about 7 carbon atoms.

When attempting to fill large molds, the rate at which these fast reacting systems need to be injected is too high for most equipment throughout the industry. Another problem commonly associated with a high injection rate is the disturbance of the reinforcement at the injection port.

One solution to this problem of systems exhibiting fast reactivity, is to use a prepolymer of an isocyanate with a fatty acid. U.S. Pat. No. 5,019,317 describes one such system based on an isocyanate prepolymer. However, prepolymers are very expensive. Accordingly, this type of system is not always economically feasible due to the increased production costs.

The present invention is directed to a method of filling large molds using the Structural Reaction Injection Molding process. This is based on extending the gel time of isocyanate-based systems, without reducing the catalyst needed for the proper curing of the urethane. Prepolymers are not necessary in the present invention. A reduction in the reactivity of the reaction mixture is achieved through the addition of a fatty acid to the B-side. The present invention reduces production costs, delays the gel time of the system, and allows full catalysis of the urethane to take place.

DESCRIPTION OF THE INVENTION

The present invention relates to an improved process for the production of SRIM molded parts. In general, this process uses molds wherein the mold cavity has the minimum dimensions of 1000 mm×3.5 mm×100 mm. These molded parts are produced by placing a reinforcing mat inside a mold cavity, closing the mold, introducing a reaction mixture comprising an isocyanate component and an isocyanate-reactive component in the presence of a catalyst into the mold at an isocyanate index of from about 90 to about 400, allowing the components to react, and removing the product from the mold. In the present process, the reinforcing fiber mat comprises from 50 to 65% by weight of the combined weight of the reaction mixture and the reinforcing fiber mat.

The isocyanate component to be used in this process comprises:

1) a polymethylene poly(phenyl isocyanate) having an isocyanate group content of from 25 to 40%, preferably about 32% by weight, and having a diisocyanate content of from 45 to 55%, preferably about 48% by weight. It is preferred that the isocyanate comprise about 45–55% by weight of polymethylene poly(phenyl isocyanate), about 5–15% by weight of 2,4'-methylene bis(phenyl isocyanate), and about 40–50% by weight of 4,4'-methylene bis(phenyl isocyanate). The 2,4'-methylene bis(phenyl isocyanate) content is more preferably about 5% by weight, and the 4,4'-methylene bis(phenyl isocyanate) is more preferably about 43% by weight.

The reaction mixture also requires 2) an isocyanate-reactive component comprising a) from about 1.0 to 15%, preferably from about 4.5 to 5% by weight, based on the total weight of said isocyanate reactive component, of a fatty acid.

In a preferred embodiment, the isocyanate-reactive component to be used in the process comprises:

2)b) from about 0.5 to 10% by weight, based on the total weight of said isocyanate reactive component, of a zinc carboxylate containing from 8 to 24 carbon atoms, and 2)c) a polyol component comprising
  i) at least one polyether polyol having a hydroxyl functionality of from 2 to 8 and a molecular weight of from 350 to 1800,
  ii) at least one hydroxyl functional organic material having a hydroxyl functionality of from 2 to 8, and a molecular weight of below 350, with components 2) c)i) and 2) c)ii) being used in a weight ratio of from about 10:1 to about 1:10, and
  iii) no more than 45% by weight, based on the total weight of said polyol component, of an active hydrogen containing compound having a molecular weight of 1800 or more, in addition to the necessary fatty acid 2)a) as described hereinabove.

The fatty acids which are necessary to the present invention include those compounds represented by the general formula: $R(CO_2H)n$, wherein n represents 1, 2, or 3; and R contains at least 10 carbon atoms. R may be alkyl (cyclic, linear or branched), alkaryl, aralkyl, or aryl, and either saturated or unsaturated. Some examples of useful fatty acids include compounds such as undecanoic acid, dodecanoic acid, lauric acid, palmitic acid, stearic acid, isostearic acid, oleic acid, linoleic acid, ricinoleic acid, alaidic acid, linolenic acid, train oil fatty acids, fatty acids obtained from coconut oil, tallow fatty acids or fatty acids obtained by paraffin oxidation, tall oil fatty acids, myristic acid, montanic acid, arachidic acid, etc. One preferred fatty acid is oleic acid.

The polymethylene poly(phenyl isocyanates) useful herein are known in the art and are produced by reacting phosgene with aniline formaldehyde condensates. Known processes for preparing the aniline/formaldehyde condensates and the resultant polyisocyanate are described in the literature and in many patents such as, for example, U.S. Pat. Nos. 2,683,730, 2,950,263, 3,012,008, 3,344,162, and 3,362,979, the disclosures of which are herein incorporated by reference. The polymethylene poly(phenyl isocyanates) useful herein have an isocyanate group content of from 25 to 40%, preferably about 32%, and contain from about 45 to 55%, preferably about 48%, by weight of methylene bis(phenyl isocyanate). It is preferred that the isocyanate comprise 45–55% of polymethylene poly(phenyl isocyanate), 5–15% by weight of 2,4'-methylene bis(phenyl isocyanate), and 40–50% by weight of 4,4'-methylene bis(phenyl isocyanate). The 2,4'-methylene bis(phenyl isocyanate) content is more preferably about 5% by weight, and the 4,4'-methylene bis(phenyl isocyanate) is more preferably about 43% by weight. As noted hereinabove, the isocyanate index of the total system is from about 90 to 400.

Suitable polyol components to be used as isocyanate-reactive components in the process include those polyols known to one skilled in the art of polyurethane chemistry. The preferred polyol components include those described in, for example, U.S. Pat. No. Re. 33,609, the disclosure of which is herein incorporated by reference.

Suitable zinc carboxylates to be used in the B-side of the reaction mixture for the present invention include those described in, for example, U.S. Pat. No. 5,019,317, the disclosure of which is herein incorporated by reference.

In addition to the above components, reinforcing mats, blowing agents, catalysts, surface-active additives, foam stabilizers, cell regulators, flameproofing agents, pigments or dyes, anti-oxidants, etc. which are suitable for the present invention include those described in, for example, U.S. Pat. No. Re. 33,609, the disclosure of which is herein incorporated by reference.

The invention is further illustrated but is not intended to be limited by the following examples in which all parts and percentages are by weight unless otherwise specified.

EXAMPLES

General Procedure:

The polyurethane systems used represent typical RIM two-component systems. The A-side is a typical polymeric diphenylmethane diisocyanate and is described hereinbelow. The B-side is a mixture of polyols and/or other organic compounds containing isocyanate-reactive hydrogens, catalysts and an IMR agent. These components are also described hereinbelow. The IMR agent was added to the B-side of the system.

All of these examples relate to a SRIM (i.e. structural reaction injection molding) process, wherein the specified number (or quantity) of reinforcing mats were replaced in the tool.

The temperature of both the A and B components in all of the working examples was maintained at about 90° F.

Prior to beginning the trials, the surface of the mold used in each example was cleaned with Chem-Trend 201B mold cleaner (i.e. n-methyl pyrrolidone). Then, the mold surface was treated with a base coat of Chem-Trend 2080 paste wax and a light spray of Chem-Trend CT-2006. The mold cavity in each example was maintained at approximately 185° F. No additional paste wax or external mold release was used after the molding of the first part in each example.

A Henneke HK-245 machine using a 10 mm KM mixhead was used in each example to inject the A- and B- sides into the molds.

A successful release requires no sticking or tearing of the molded part, and the part was removed from the mold without applying significant force.

This general procedure was followed in all working examples, except as noted otherwise in the individual examples.

The following materials were used in the working examples.

Acid A: oleic acid, commercially available from Chemical Associates

Polyol A: an adduct of propylene glycol and propylene oxide, having an equivalent weight of about 212

Polyol B: an adduct of glycerin with a mixture of ethylene oxide and propylene oxide in a ratio of about 82:18% by weight, and having an equivalent weight of about 2003

Polyol C: an adduct of ethylene diamine with propylene oxide, having an equivalent weight of about 89

Polyol D: IMR concentrate having an equivalent weight of about 148; this consists of zinc stearate and Polyol C at a molar ratio of 2:3 (respectively)

EG: ethylene glycol

PC-15: a tertiary amine with a reactive secondary amine

Sa-610-50: an acid blocked 1,5-diazodicydo(5.4.0)undec-5-ene delayed action catalyst ISO A: a polymethylene poly(phenyl isocyanate) having an isocyanate group content of about 32% by weight, and having a diisocyanate content of about 48% by weight. The isocyanate comprises about 52% by weight of polymethylene poly(phenyl isocyanate), about 5% by weight of 2,4'-methylene bis(phenyl isocyanate), and about 43% by weight of 4,4'-methylene bis(phenyl isocyanate).

Short Gel Time—Usual System

Example 1

The B-side of the reaction mixture was prepared by mixing 36 parts by weight of Polyol A, 24 parts by weight of Polyol C, 22 parts by weight of EG, 18 parts by weight of Polyol B, 1.0 parts by weight of SA-610-50, and 0.5 parts by weight of PC-15. Next, 10 parts of Polyol D were added to 100 parts of the above B-side.

This was reacted against Isocyanate A.

The components were mixed at a weight ratio of 153 parts of A-side to 100 parts B-side at impingement pressures of about 2000 psi. The mixture was injected into a 381 mm×381 mm×3.2 mm steel tool held in a 30 ton press.

Two layers of 2 oz./ft.$^2$ continuous strand fiberglass mat (Owens Corning M-8610) were placed in the mold prior to injecting the reaction mixture.

After 2 minutes, the part was demolded with no residual material left on the mold. Sixty parts were made with only one wax treatment to the mold. Release was excellent throughout the study.

The drawback of the system was that it had a gel time of 3 sec, which is very fast. This fast gel time does not allow thorough filling of large parts with higher glass mat loadings.

Addition of Oleic Acid 5 pts—more than double gel time

Example 2

The B-side was prepared by mixing 36 pads by weight of Polyol A, 24 parts by weight of Polyol C, 22 parts by weight of EG, 18 parts by weight of Polyol B, 5 parts by weight of Acid A. 1.0 parts by weight of SA-610-50, and 0.5 parts by weight of PC-15. Next, 10 parts of Polyol D was added to 100 parts of the above B-side.

This was reacted against isocyanate-A.

The components were mixed at a weight ratio of 148 parts of A-side to 100 parts B-side at impingement pressures of about 2000 psi. The mixture was injected into a 381 mm×381 mm×3.2 mm steel tool held in a 30 ton press.

Prior to injecting the reaction mixture, two layers of 2 oz/ft.$^2$ continuous strand fiberglass mat (Owens Corning M-8610) were placed in the mold.

The parts were still demolded in 2 minutes with an acceptable surface. Fifty acceptable parts were made with no further mold release being applied.

The biggest asset of this system was the extended gel time of 8 seconds.

Bumper Beam Trial

Example 3

The B-Side was prepared by mixing 36 parts by weight of Polyol A, 24 parts by weight of Polyol C, 22 parts by weight of ethylene glycol, 18 parts by weight of Polyol B, 5.0 parts by weight of Acid A, 1.0 parts by weight of SA-610-50, and 0.5 parts by weight of PC-15. Next, 10 parts of polyol D was added to each 100 parts base polyol. This was reacted against isocyanate A.

The components were mixed at a weight ratio of 148 parts of A-side to 100 of B-side at impingement pressures of about 2500 psi. This mixture was injected into an experimental bumper beam tool having dimensions of 1218 mm long, 145 mm wide, and a varying thickness of from 4.6 mm to 5.3 mm. This tool was held on a 600 ton Cannon press.

Prior to injecting the reaction mixture into the tool, four layers of Fabmat 2415 (Fiber-Glass industries) reinforcement were placed in the mold. This glass consists of a layer of woven roving (24 oz/yd$^2$) with chopped strand fiber bound to the one side (1.5 oz/ft$^2$). The glass loading was 60% by weight.

Material temperatures were maintained at 90° F. and the mold temperature was maintained at approximately 180° F.

After 45 seconds, the part was demolded. No residual urethane was left on the molding surface. Twenty beams were made without difficulty before the study was voluntarily ended.

The glass wet out of the molded part was excellent and no glass movement was seen. The 8 sec gel time allowed a slow through-put of 454 g/sec to be used with a shot size of approx. 3 kg.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the preparation of a SRIM molded product by placing a reinforcing fiber mat inside a mold cavity having the minimum dimensions of 1000 mm×100 mm×3.5 mm, closing said mold, introducing a reaction mixture comprising an isocyanate component and an isocyanate reactive component in the presence of a catalyst into said mold at an isocyanate index of from about 90 to about 400, allowing the components to react, and removing the product from the mold, wherein said reinforcing fiber mat comprises from 50 to 65% by weight of the combined weight of said reaction mixture and said reinforcing fiber mat, the improvement wherein:
   1) said isocyanate component comprises a polymethylene poly(phenyl isocyanate) having an isocyanate group content of from 25 to 40% by weight, and having a diisocyanate content of from 45 to 55% by weight, and
   2) said isocyanate-reactive component comprises
      a) from about 1 to 15% by weight, based on the total weight of said isocyanate-reactive component, of a fatty acid,
      b) from about 0.5 to 10% by weight, based on the total weight of said isocyanate reactive component, of a zinc carboxylate containing from 8 to 24 carbon atoms, and
      c) a polyol component comprising
         i) at least one polyether polyol having a hydroxyl functionality of from 2 to 8 and a molecular weight of from 350 to 1800,
         ii) at least one hydroxyl functional organic material having a hydroxyl functionality of from 2 to 8, and a molecular weight of below 350, with components 2)c)i) and 2)c)ii) being used in a weight ratio of from about 10:1 to about 1:10, and
         iii) no more than 45% by weight, based on the total weight of said polyol component, of an active hydrogen containing compound having a molecular weight of 1800 or more.

2. The process of claim 1, wherein said isocyanate component comprises from 45–55% by weight of polymethylene poly(phenyl isocyanate), 5–15% by weight of 2,4'-methylene bis(phenyl isocyanate), and 40–50% by weight of 4,4'-methylene bis(phenyl isocyanate).

3. The process of claim 2, wherein said isocyanate component has an isocyanate group content of about 32% by weight, and having a diisocyanate content of about 48% by weight.

4. The process of claim 2, wherein said isocyanate-reactive component comprises from 4.5 to 5% by weight, based on the total weight of said isocyanate-reactive component, of said fatty acid.

* * * * *